United States Patent [19]

Sullivan

[11] Patent Number: 5,220,537
[45] Date of Patent: Jun. 15, 1993

[54] STATISTICALLY CALIBRATED TRANSDUCER

[75] Inventor: Edmund J. Sullivan, Portsmouth, R.I.

[73] Assignee: The United States of America as represented by the Secretary of the Navy, Washington, D.C.

[21] Appl. No.: 929,215

[22] Filed: Aug. 13, 1992

[51] Int. Cl.$^5$ .............................................. G01S 15/00
[52] U.S. Cl. .................................................. 367/130
[58] Field of Search ............... 367/130, 126, 124, 119, 367/118, 153, 103, 106, 99; 114/253

[56] References Cited

U.S. PATENT DOCUMENTS 4,974,213 11/1990 Siwecki ................................. 367/153

Primary Examiner—Daniel T. Pihulic
Attorney, Agent, or Firm—Michael J. McGowan; Prithvi C. Lall; Michael F. Oglo

[57] ABSTRACT

The apparatus and method for determining the direction of an incoming sonar signal using a towed array having at least two auxiliary transducers positioned along the array. Each auxiliary transducer contains a plurality of small transducers. By summing the output from each of the small transducers, thereby forming the outputs of the auxiliary transducers, and combining the output of the auxiliary transducers with the output of the towed array, the direction of arrival of a sonar signal impinging upon the towed array is determined.

5 Claims, 1 Drawing Sheet

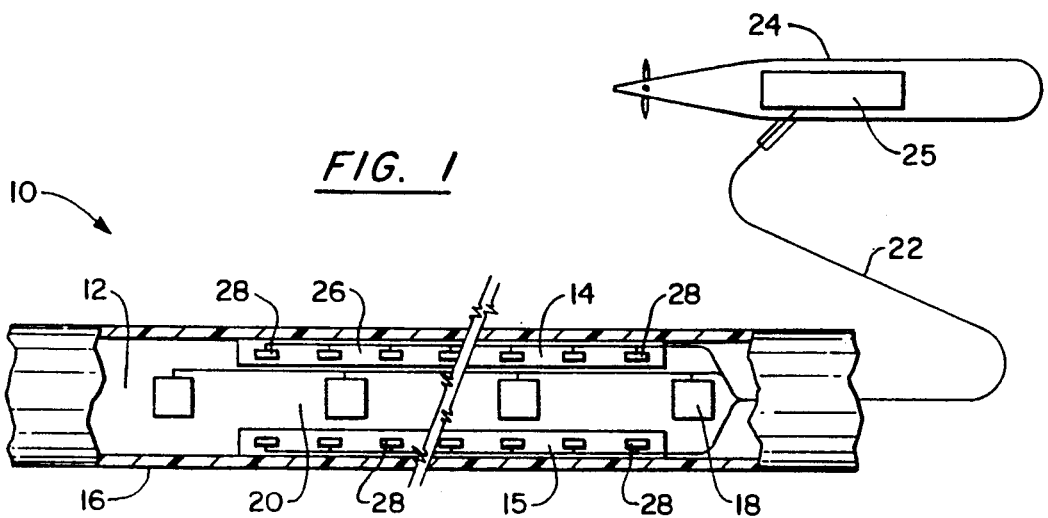
FIG. 1
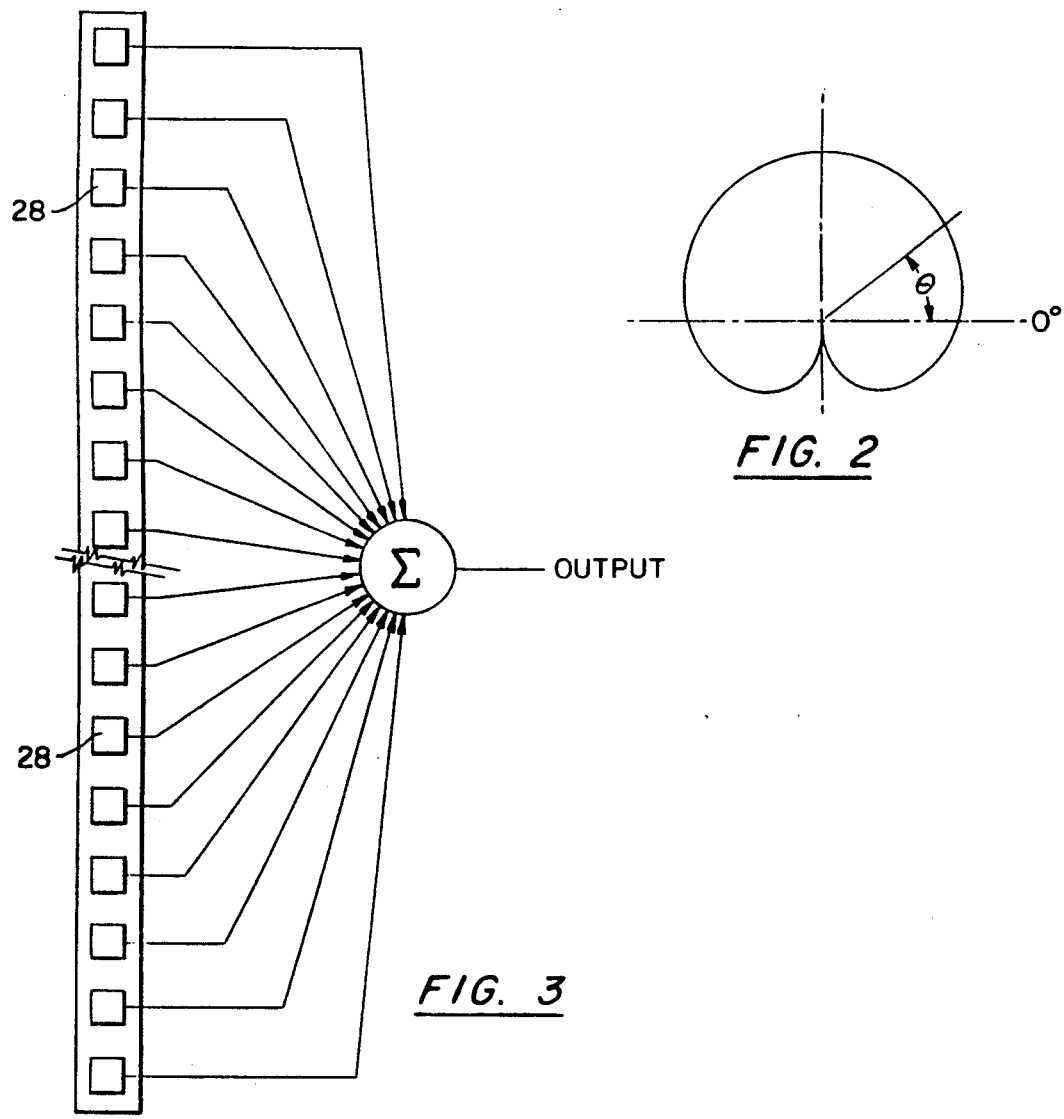
FIG. 2
FIG. 3

STATISTICALLY CALIBRATED TRANSDUCER

STATEMENT TO GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates generally to transducer arrays that are towed by ocean vessels. More particularly, this invention relates to towed arrays having auxiliary transducers useful to determine the direction of origin of a sonar signal impinging on the array.

(2) Description of the Prior Art

Arrays of hydrophones are conventionally towed by surface ships and submarines for the purpose of sensing sound below the surface of the ocean. Typically, such arrays are linear assemblies of hydrophones mounted in an elongated plastic or rubber hose. The hose sections are filled with a fluid that surrounds the hydrophones. Sound pressure waves in the ocean pass through the hose wall and into the fluid that surrounds the hydrophones. The hydrophones sense the pressure fluctuations and transforms the sensed pressures into electrical signals which are transmitted by a cable back to the vessel. The electrical signals are then processed to derive characteristics of the sound or a representation thereof.

A well-known problem with conventional towed arrays is that when beamforming electronics are used to determine the incident angle of the sonar signal, it is generally not possible to determine whether the sonar source is positioned to the left or the right of the array. This situation is usually referred to as the "left-right ambiguity problem."

One known way of dealing with the left-right ambiguity problem is to take a first measurement, maneuver the towship to another position, and take a second measurement in order to break the symmetry. However, this technique requires a considerable amount of time, because after the towship is turned, the array can take up to twenty minutes to straighten. Another known technique is to introduce a known distortion into the shape of the array, and then to correct the beamformer to compensate for this distortion. However, this method has a drawback in that the degree of distortion must be accurately determined.

SUMMARY OF THE INVENTION

It is therefore an object of the invention to provide an apparatus which will determine not only the angle of arrival of a sonar signal impinging on a towed array, but also will simultaneously determine whether the origin of the signal is from the left or the right of the array. A further object of the invention is to provide a method for adapting a conventional towed array such that the direction of origin of a sonar signal impinging on the array can be determined.

These and other objects of the invention will become more apparent from the following description.

The above objects are realized by connecting two or more auxiliary transducers to an elongated towed array. The towed array, which can be of a conventional structure, includes a linear arrangement of hydrophones or other transducers for sensing a pressure wave in the array and generating an output signal indicative thereof. The auxiliary transducers are mounted on the towed array, each being angularly spaced from the central axis of the towed array. Preferably, each auxiliary transducer includes a plurality of small transducers which sense a pressure wave and generate an output signal indicative thereof. The output from the small transducers making up a single auxiliary transducer is combined to produce a single output signal from each auxiliary transducer. The output signals from the auxiliary transducers are then combined to form a dipole or higher order multiple array, such as a quadrapole in the case of four auxiliary transducers, which is combined with the output of the towed array to determine the direction of arrival of the sonar signal on the array.

In a preferred embodiment of the invention, two auxiliary transducers, each including 100 linearly arranged small hydrophones, are placed on opposite sides of the inner wall of the towed array, parallel to the length of the towed array. The small hydrophones of the two auxiliary transducers are beamformed as a dipole to produce a directional response in the form of a cardioid pattern. Preferably, the direction of the sonar signal is determined by multiplying the output of the beamformer of the towed array by the cardioid pattern.

BRIEF DESCRIPTION OF THE DRAWINGS

A more complete understanding of the invention and many of the attendant advantages thereto will be readily appreciated as the invention becomes better understood by reference to the following detailed description when considered in conjunction with the accompanying drawings wherein:

FIG. 1 is a fragmentary schematic view, partly in section and partly broken away, of a towed array incorporating a pair of auxiliary transducers in accordance with the present invention, the towed array being attached to a submarine;

FIG. 2 illustrates a cardioid response pattern obtained by beamforming the pair of auxiliary transducers of the towed array illustrated in FIG. 1; and FIG. 3 is a schematic view, partly broken away, illustrating a single auxiliary transducer that incorporates a plurality of small hydrophones, the output of the small hydrophones being summed to produce a single output from the auxiliary transducer.

DESCRIPTION OF THE PREFERRED EMBODIMENT

With reference to FIG. 1, a sonar signal measuring device is generally designated by the numeral 10. The device includes a towed array 12 which has first and second auxiliary transducers 14, 15, respectively, mounted on the inner wall thereof, opposite one another. The towed array 12 includes a housing 16 constructed from reinforced sections which are manufactured from rubber or plastic and are reinforced with Kevlarx TM fibers or other suitable fibers. Each of the hose sections typically will be several inches in diameter and have a length of about 40 feet to several hundred feet. The hose sections are coupled together to form the towed array. The housing 16 contains a series of linearly arranged hydrophones 18. A fluid 20 surrounds the hydrophones 18 in the housing 16. The sonar signal measuring device 10 is towed from a subsea cable bundle 22 behind a submarine 24 or a surface ship for the purpose of detecting sound below the surface of the water. The cable bundle 22 also contains individual cables for the hydrophones 18 within the housing 16.

Sound pressure waves in the ocean pass through the wall of the housing 16 and into the fluid 20 that surrounds the hydrophones 18. The hydrophones 18 sense the fluctuation of the pressure caused by the sound waves in the fluid 20 in a conventional manner, and convert the pressure fluctuations to corresponding electrical signals. The electrical signals, which are then transmitting through the cable bundle 22 to the submarine 24, are processed in the processing means 25 to derive certain characteristics of the sound or a representation thereof.

The first and second auxiliary transducers 14,15 are mounted on opposite sides of the inner wall of the housing 16 of one of the sections of the towed array 12, i.e., angularly spaced from the central axis of the towed array 12. Other arrangements of the auxiliary transducers can be used. For example, the auxiliary transducers can be mounted in separate, small hoses which are attached to the outer wall of the towed array 12, or can be placed within a larger hose placed around the towed array 12 in a concentric arrangement.

The first and second auxiliary transducers 14,15 each comprise an auxiliary transducer mounting strip 2 constructed from any convenient rigid material, such as plastic, which is fastened by an adhesive or other suitable connection to the inner wall of the towed array 12. Preferably, the two auxiliary transducers 14,15 are as widely separated from each other as is possible in a direction perpendicular to the length of the towed array 12.

Each auxiliary transducer mounting strip 26 supports 100 small polymer hydrophones 28. The first and second auxiliary transducers 14,15 are the same length, i.e., a few inches to several inches long, and extend in a direction parallel to the length of the towed array, preferably, but not necessarily along the same portion of the length of the towed array. Cable bundle 22 includes cables connecting the first and second auxiliary transducers 14,15 to the signal processing means 25. Alternatively, the signals from the auxiliary transducers, and/or the signal from the towed array can be processed in the towed array itself. In the preferred embodiment, the difference in sensitivity of any two of the 200 small hydrophones is no more than about 10%. More than two auxiliary transducers can be included on a single towed array.

The first and second auxiliary transducers 14,15 form a small dipole array that can be beamformed to produce a cardioid-type directional response pattern, which is shown in FIG. 2. A signal from the right of the towed array will result in output along a portion of the cardioid pattern illustrated in FIG. 2 above the 0°-180° axis. A signal from the left will result in an output value along the outline of the cardioid pattern in the region below the 0°-180° axis. The output of the beamformer of the hydrophones in the conventional towed array is multiplied or combined in another suitable manner with the cardioid pattern to determine the direction of arrival of the incoming signal.

A single output signal from each of the first and second auxiliary transducers 14,15 is obtained by summing the signal from each small hydrophone 28 within the single auxiliary transducer. Thus, the output from the first auxiliary transducer 14 of FIG. 1 is determined by adding the output from each small hydrophone 28 within the first auxiliary transducer 14. The output from the second auxiliary transducer 15 shown in FIG. 1 is determined by summing the output from each of the small hydrophones 28 in the second auxiliary transducer 15.

The output from the first auxiliary transducer 14 can be represented by the formula $Ae^{i\phi}$, and the output from the second auxiliary transducer 15 is represented by $(A+\delta)e^{-ik\Delta\sin\theta}$ where $A$ = strength or sensitivity of the output of the transducer;

$\theta$ = the angle of the incoming signal relative to the 0° axis;

$\phi$ = the phase that must be introduced to ensure that complete cancellation occurs between the two signals;

$\delta$ = the difference in sensitivities of the first and second transducers;

$k = 2\pi/\lambda$, where $\lambda$ = the wavelength of the acoustic signal; and $\Delta$ = the width of the towed array.

The difference of the equations shown above is taken in order to form a cardioid pattern, resulting in equation 1:

$$f(\Delta,\theta) = A[i\phi + ik\Delta\sin\theta - (\delta/A)]. \qquad (1)$$

In equation 1, the approximation $e^x = 1+x$ for $x \ll 1$ has been used, and a term equal to $(ik\Delta\delta/A)\sin\theta$ has been neglected 23 because it is of second order. It is then assumed that $\delta$ is equal to 0 and $\phi$ is equal to $k\Delta$. Thus, equation 1 reduces to equation 2:

$$f(\Delta,\theta) = iAk\Delta(1+\sin\theta) \qquad (2)$$

the absolute magnitude of which represents the cardioid pattern shown in FIG. 2. If $\delta$ is not equal to 0, the cardioid pattern will not obtain unless $\delta/A$ is much smaller than $k\Delta$. According to the preferred embodiment, the term $\delta/A$ reasonably can be neglected if the absolute value of $\delta/A$ is less than or equal to 0.01, i.e., the sensitivity of the first and second auxiliary transducers 14,15 differs by no more than about 1%.

The present invention achieves a 1% effective variation in the sensitivities of the first and second auxiliary transducers 14,15 by forming each auxiliary transducer from a linear series of about 100 hydrophones selected from a batch of small hydrophones having a 10% or lower variation in sensitivity between any two of the small hydrophones. A variation in sensitivity of 10% for the batch of hydrophones is represented by the formula $\sigma/\hat{A} = 0.1$, where $\pi$ = the standard deviation of the sensitivities for the entire batch and $\hat{A}$ = the mean sensitivity of the batch. When a sample of N of these hydrophones is arranged in an array to form an auxiliary transducer, the transducer has a sensitivity of $\overline{A}N$, where $\overline{A}$ = the mean sensitivity for the N hydrophones. The standard deviation for the sample mean is $\sigma_{\overline{A}} = \sigma/\sqrt{N}$. When each auxiliary transducer contains 100 small hydrophones, N=100. Thus, $\sigma_{\overline{A}} = 10/ = 0.1/10 = 0.01$.

In the preferred embodiment, each auxiliary transducer 14, 15 is made from a linear strip of 100 small polymer hydrophones, and the two mounting strips are placed on opposite sides of the towed array 12. However, optical or ceramic hydrophones can be used place of the polymer hydrophones, and the auxiliary hydrophones can be disposed in a non-linear arrangement, or in an arrangement such that the hydrophones are not on directly opposite sides of the towed array. The angular displacement or position of each auxiliary transducer 14,15 relative to the central axis of the towed array can be taken into account in the beamforming process. While the auxiliary hydrophones 28 are preferably beamformed to pattern which will result in output indicative of the direction of an incoming sonar signal. Furthermore, the number of hydrophones in each auxiliary transducer can be more or less than 100, as long as the effective sensitivity of the auxiliary transducers is sufficient to result in an accurate directional determination.

It will be understood that various other changes in details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for determining the direction of an incoming sonar signal, comprising:
   a towed array including a linear arrangement of hydrophones for sensing a pressure wave in the array and generating an output signal indicative thereof, the array having a central axis and a housing surrounding the central axis;
   at least first and second auxiliary transducers positioned in the housing of the towed array, angularly spaced relative to the central axis, each of the first and second auxiliary transducers including a plurality of transducers for sensing the pressure wave and generating an output signal indicative thereof, each of said first and second auxiliary transducers including 100 transducers, smaller than said first and second transducers, in a linear arrangement; and
   signal processing means for processing the output signals from the towed array and the first and second auxiliary transducers to determine the direction of the incoming sonar signal.

2. An apparatus for determining the direction of an incoming sonar signal, comprising:
   a towed array including a linear arrangement of hydrophones for sensing a pressure wave in the array and generating an output signal indicative thereof, the array having a central axis and a housing surrounding the central axis;
   at least first and second auxiliary transducers positioned in the housing of the towed array, angularly spaced relative to the central axis, each of the first and second auxiliary transducers including a plurality of transducers for sensing the pressure wave and generating an output signal indicative thereof, the variation in sensitivity of any two of the plurality of transducers comprising said first and second auxiliary transducers being no more than about 10%; and
   signal processing means for processing the output signals from the towed array and the first and second auxiliary transducers to determine the direction of the incoming sonar signal.

3. An apparatus for determining the direction of an incoming sonar signal, comprising:
   a towed array including a linear arrangement of hydrophones for sensing a pressure wave in the array and generating an output signal indicative thereof, the array having a central axis and a housing surrounding the central axis;
   at least first and second auxiliary transducers positioned in the housing of the towed array, angularly spaced relative to the central axis, each of the first and second auxiliary transducers including a plurality of transducers for sensing the pressure wave and generating an output signal indicative thereof; and
   signal processing means for processing the output signals from the towed array and the first and second auxiliary transducers to determine the direction of the incoming sonar signal, said signal processing means processing the output from said first auxiliary transducer and the output from said second auxiliary transducer to form a dipole array, which is multiplied by the output from the towed array.

4. An apparatus for determining the direction of an incoming sonar signal, comprising:
   a towed array including a linear arrangement of hydrophones for sensing a pressure wave in the array and generating an output signal indicative thereof, the array having a central axis and a housing surrounding the central axis;
   at least first and second auxiliary transducers positioned in the housing of the towed array, angularly spaced relative to the central axis, each of the first and second auxiliary transducers including a plurality of transducers for sensing the pressure wave and generating an output signal indicative thereof; and
   signal processing means for processing the output signals from the towed array and the first and second auxiliary transducers to determine the direction of the incoming sonar signal, the direction of the incoming signal being substantially derived from the formula:

$$f(\Delta,\theta) = iAk\Delta(1+\sin\theta)$$

wherein
   $f(\Delta\theta)$ = the difference of the output of the first and second auxiliary transducers;
   A = strength or sensitivity of the transducer;
   $k = 2\pi/\lambda$, where $\lambda$ = the wavelength of the acoustic signal.
   $\Delta$ = the width of the towed array; and
   $\theta$ = the angle of the incoming signal relative to the reference axis.

5. A method for determining the direction of arrival of a sonar signal impinging upon a towed array, comprising the steps of:
   positioning first and second auxiliary transducers on different sides of the towed array, each of the first and second auxiliary transducers comprising a linear arrangement of a plurality of transducers smaller than said first and second transducers and extending in a direction parallel to the towed array;
   separately generating auxiliary output signals from the first auxiliary transducer and the second auxiliary transducer;
   generating a primary output signal from the towed array; and
   beamforming the auxiliary output signals and combining the result with the primary output signal.

* * * * *